Patented Nov. 14, 1950

2,529,553

UNITED STATES PATENT OFFICE 2,529,553

PREPARATION OF ALIPHATIC ALCOHOLS

William Hunter, Spondon, near Derby, England, assignor to Celanese Corporation of America, a corporation of Delaware No Drawing. Application December 4, 1946, Serial No. 713,915. In Great Britain January 16, 1946

8 Claims. (Cl. 260—639)

This invention relates to improvements in the manufacture of organic compounds and is more particularly concerned with the manufacture of alcohols by the hydration of olefins.

The manufacture of ethyl alcohol by hydrating ethylene by absorption in sulphuric acid followed by hydrolysis of the ethyl sulphates produced is a process which has for years attracted considerable attention owing to the fact that alcohol is of considerable industrial value while ethylene is a relatively cheap starting material. However, the process is one which is very expensive to operate involving the use of sulphuric acid of high concentration as reagent in sufficient quantities for it to be essential to recover this substance, and making necessary the concentration of the acid from the dilute form in which it is recovered at the end of the process, and also involving the use of a large quantity of heat in rectifying the alcohol produced to obtain it in concentrated or anhydrous form of suitable purity for further use. Moreover, there is a considerable tendency to the formation of ether as a by-product; this compound, while being of substantially more value than ethylene, is not so important as an industrial raw material as is ethyl alcohol and its production is to be avoided if possible. The present invention comprises a method of carrying out the hydration of ethylene with the aid of sulphuric acid which enables ethyl alcohol of high purity to be obtained, while suppressing, if desired, the formation of diethyl ether, at a cost which is substantially lower than is usually regarded as possible.

According to the present invention ethyl alcohol is manufactured by a process which comprises absorbing ethylene in sulphuric acid of high concentration, hydrolysing the absorption product, separating from the products of hydrolysis any oily or tarry matters and distilling the residue under sub-atmospheric pressure to obtain a head product of dilute aqueous ethyl alcohol and a base product of sulphuric acid of substantial concentration.

Each of the steps of the novel process contributes to the valuable result obtained and for optimum results each step must be carried out under carefully controlled chosen conditions as will be explained in greater detail.

For the production of the absorption product it is preferred to employ sulphuric acid of high concentration, namely, more than 90% and preferably of the order of 95% concentration. With such acid, after the initial induction period, absorption is rapid and the minimum time is employed in securing a useful degree of absorption. On the other hand, while a somewhat more rapid absorption can be obtained with 100% sulphuric acid the very substantial increase in cost which is involved in using this acid over the use of an acid of about 95% concentration more than outweights this advantage. It is preferred to absorb ethylene until an absorption product is obtained containing about one molar part of ethylene per molar part of sulphuric acid or somewhat less ethylene than this, for example about 0.8 to 1.0 molar part of ethylene. While absorption products containing substantially more ethylene than this could be obtained, an excessively long absorption period must be used and, moreover, difficulties may be encountered in the subsequent hydrolysis with such concentrated products.

The hydrolysis of the absorption product is carried out by admixing the same with a suitable quantity of water and heating the mixture and maintaining the mixture in a state of agitation during the initial part of the hydrolysis while the diethyl sulphate present is still in the form of a separate phase. Once the diethyl sulphate has been hydrolysed the product is in a single phase and agitation is no longer necessary. In practice, after the disappearance of the diethyl sulphate phase, the mixture of absorption product and water can be boiled under reflux until substantial hydrolysis has occurred. The initial stage of the hydrolysis may be carried out at 90° C. or higher, up to the boiling point which is about 96° C. under atmospheric pressure, at which temperature the hydrolysis is quite rapid, but lower temperatures are quite satisfactory, e. g. about 60° C., and provided efficient agitation of the mixture is maintained there is little danger of excessive ether formation. The quantity of water added to the initial absorption product must not be excessive or else the alcohol and sulphuric acid recovered as final products will be so dilute that substantial expenditure of heat will be necessary to recover them in the more concentrated form in which they are ultimately required. On the other hand, if too little water is used ether formation becomes noticeable and, in general, where the absorption product is of the type already referred to and contains from about 0.8 to 1.0 molar part of ethylene per molar part of sulphuric acid, it is desirable to add from 1.2 to 1.5 parts by weight of water to each part by weight of absorption product.

The separation from the product of hydrolysis of the oily or tarry matters which frequently appear, especially where the ethylene is obtained by the cracking of oils or is otherwise liable to contain other reactive ingredients in admixture with it, is a most important part of the present invention. It is however a simple matter to separate these products as after hydrolysis has proceeded to a substantial degree and, using the quantities of water indicated above, it is possible to hydrolyse 80 to 90% of the ethyl hydrogen sulphate formed initially or as a result of the preliminary hydrolysis of diethyl sulphate, these oily or tarry matters separate out as an upper layer on the absorption product and can be removed by decanting.

After hydrolysis the alcohol obtained is directly distilled from the products under subatmospheric pressure. This step, when using quantities of water of the order of those indicated above, makes possible the attainment of a very valuable and quite new result in that the alcohol removed carries with it a very large portion of the water contained in the products of the hydrolysis and the base product consists of sulphuric acid of a concentration of about 70% or even higher. This result can be achieved by using a pressure of about 100 mm. and it is important to note that during the distillation the base temperature should not be permitted to rise above 115° C. If the base temperature increases say to 120° C. ether formation at once becomes apparent. For this reason the pressure during distillation should not exceed 100 mm. and even lower pressures, e. g. 50 mm., may be maintained if desired. Operating under optimum conditions it is possible to obtain not only sulphuric acid of about 70% or higher concentration, as compared with 40% or less as is commonly obtained in known processes, but, moreover, the alcohol produced, which may be of a concentration of from somewhat below 20% to somewhat above 35%, according to the actual amount of water used in hydration, is sufficiently pure to be used for any industrial process, even for the manufacture of acetaldehyde where the presence of quite small quantities of impurities poisons the catalyst used and prevents the oxidation being carried out efficiently.

While, as above indicated, the alcohol obtained by the new process is of a high degree of purity it has been found in practice better to employ for subsequent operations all except the last 10 to 15% of the alcohol recoverable from the absorption product. This is because it has been found that any traces of impurities of an oily nature which do escape separation before distillation appear during the recovery of the last part of the alcohol and, moreover, this part of the alcohol is usually recovered at a somewhat lower concentration than that of the major part of the product. Accordingly, the preferred form of the invention comprises recovery of the major part of the alcohol followed by the separate recovery of the last 10 to 15% of the alcohol, this second fraction being returned to the process by being mixed with the water used in the hydrolysis stage. This method of operation has been found particularly convenient since it makes possible the distillation of most of the alcohol at a base temperature below 75° C. using a pressure of 100 mm. while the residual alcohol can be distilled at a base temperature not exceeding 115° C. under a pressure of 100 mm. to leave sulphuric acid of about 75% w./w. concentration.

The conditions set out above can be adopted very effectively in both batch processes and continuous processes as is shown in the following examples, which illustrate the production of ethyl alcohol.

Example 1

125 parts of an ethylene absorption product containing 0.8 molar part of ethylene to each part of sulphuric acid are hydrolysed by being heated with stirring together with 152 parts of water, the hydrolysis being effected at 90–96° C. and the stirring being stopped as soon as the reactants form a single phase and thereafter hydrolysis being continued by boiling under reflux for a period of about an hour. Thereafter the mixture, after separating the small oily top layer, is fed to a column and distilled under a pressure of 100 mm. while maintaining the base temperature at 75° C. In this way very pure ethyl alcohol of about 25% concentration can be recovered. When about 88–90% of the alcohol present has been distilled the base temperature is allowed to rise to 115° C. while maintaining the pressure at 100 mm., the distillate being collected separately and returned to the hydrolysis stage. The final base product consists of sulphuric acid of approximately 75% w./w. concentration.

Example 2

Water and an ethylene absorption product containing 0.8 molar part of ethylene to each molar part of sulphuric acid in the ratio of 1.4 parts by weight of water to each part by weight of absorption product are fed continuously to the first of five similar vessels connected in series and each provided with steam coils or other heating means and thermometers. The first three vessels are fitted with efficient stirrers and are maintained at about 60° C., while the remaining vessels are without stirrers and are maintained at a temperature, approximately 95° C., such that the liquid passing through them boils. The rate of supply is adjusted so that the liquor issuing from the third vessel is free from diethyl sulphate and consists substantially of sulphuric acid, ethanol, water and ethyl hydrogen sulphate. About 90% of the ethyl hydrogen sulphate is hydrolysed during the passage of the liquor through the fourth and fifth vessels, equilibrium conditions being reached by the time the liquor leaves the fifth vessel. The actual number of vessels used for the two stages of the hydrolysis can be modified according to the temperature used and the relative sizes of the vessels. The larger the vessels for a given supply rate and the higher the temperature, the fewer the vessels needed.

The liquor leaving the fifth vessel is passed continuously through a florentine or similar vessel for the separation therefrom of tarry or oily matter and then to a distillation column operated at 50 to 100 mm. absolute pressure with a base temperature of 60°–65° C. Aqueous ethanol of a high degree of purity at 25–30% concentration is collected as head product in quantity practically equal to that formed during the hydrolysis stages, substantially no further hydrolysis occurring in the distillation column. Base liquor from the column is fed to the top of a second column also operating at 50–100 mm. absolute pressure, but with a base temperature of 115° C. The hold up in the column is sufficient to enable the remaining ethyl hydrogen sulphate to be completely hydrolysed. The distillate consists of approximately 5% aqueous ethanol, which is passed through a florentine or similar vessel to remove any tarry or oily matter, and is then returned to the hydrolysis stage for mixing with water introduced with the initial absorption product. The base product from the second column is sulphuric acid of about 75% concentration which is substantially free from ethyl hydrogen sulphate and alcohol.

While the invention has been described more particularly in connection with the manufacture of ethyl alcohol from ethylene it may with advantage be applied also to the production of isopropanol from propylene. Here again, the various steps referred to above are of the same importance and must be applied with equal care in order that the best results, including the production of isopropanol of high purity and sulphuric acid of substantial concentration may be obtained. Generally the conditions employed may be the same as those given above for hydrating ethylene. However sulphuric acid of slightly lower concentration, e. g. 85–90% and especially about 87%, is preferred for absorbing the propylene and somewhat more water may be used with advantage to effect hydrolysis of the absorption product, e. g. up to 1.8 to 1.9 parts by weight of water per part of approximately molar absorption product. The invention may also be applied to the production of alcohols from olefines higher than propylene.

Having described my invention, what I desire to secure by Letters Patent is:

1. Process for the manufacture of a lower aliphatic alcohol containing less than four carbon atoms, which comprises absorbing in sulphuric acid of at least 85% concentration at least 0.8 molar part of an olefin of 2–3 carbon atoms per molar part of sulphuric acid, mixing with the absorption product at least 1.2 times its own weight of water, heating the mixture to hydrolyze the alkyl sulphates, separating any oil matter from the hydrolysis products by decantation, distilling the residue under subatmospheric pressure to obtain a head product of dilute aqueous alcohol of less than four carbon atoms of high purity, and continuing the distillation to obtain as base product sulphuric acid of at least 70% concentration, the base temperature throughout the distillation being maintained below 115° C.

2. Process for the manufacture of ethyl alcohol, which comprises absorbing in sulphuric acid of more than 90% concentration about 0.8 to about 1 molar part of ethylene per molar part of sulphuric acid, mixing with the absorption product about 1.2 to about 1.5 times its own weight of water, heating the mixture to hydrolyze the ethyl sulphates, separating any oily matters from the hydrolysis products by decantation, distilling the residue under a pressure below 100 mm. of mercury to obtain a head product of dilute aqueous ethyl alcohol of high purity, and continuing the distillation to obtain as base product sulphuric acid of a concentration of at least 70%, the base temperature throughout the distillation being maintained below 115° C.

3. Process for the manufacture of ethyl alcohol, which comprises absorbing in sulphuric acid of more than 90% concentration about 0.8 to about 1 molar part of ethylene per molar part of sulphuric acid, mixing with the absorption product about 1.2 to about 1.5 times its own weight of water, heating the mixture to hydrolyze the ethyl sulphates, separating any oily matters from the hydrolysis products by decantation, distilling the residue at a base temperature below 75° C. to obtain the major portion of the recoverable alcohol as an aqueous solution of high purity, and continuing the distillation with a base temperature between 75° and 115° C., and collecting separately the remaining minor portion of the recoverable alcohol as a more dilute aqueous solution, the entire distillation being conducted under a pressure below 100 mm. and being continued to obtain as base product sulphuric acid of at least 70% concentration.

4. Process according to claim 3, and comprising returning said minor portion of the recoverable alcohol to the process by introduction together with water added to absorption product for the hydrolysis of ethyl sulphates.

5. Process for the manufacture of ethyl alcohol, which comprises absorbing in sulphuric acid of about 95% concentration about 0.8 to about 1 molar part of ethylene per molar part of sulphuric acid, mixing with the absorption product about 1.2 to about 1.5 times its own weight of water, heating the mixture to hydrolyze the ethyl sulphates, separating any oily matters from the hydrolysis products by decantation, distilling the residue at a base temperature below about 75° C. to obtain the major portion of the recoverable alcohol as an aqueous solution of high purity, continuing the distillation with a base temperature between 75° and 115° C. and collecting separately the remaining minor portion of the recoverable alcohol as a more dilute aqueous solution, the entire distillation being conducted under a pressure below 100 mm. and being continued to obtain as base product sulphuric acid of at least 70% concentration, and returning said minor portion of recoverable alcohol to the process by introduction together with water added to absorption product for the hydrolysis of alkyl sulphates.

6. Process according to claim 5, wherein the hydrolysis is effected in two stages, the absorption product and water being heated with constant agitation until diethyl sulphate is no longer present as a separate phase, and thereafter being boiled to hydrolyze ethyl hydrogen sulphate.

7. Process for the manufacture of isopropyl alcohol, which comprises absorbing in sulphuric acid of 85 to 90% concentration about 0.8 to about 1 molar part of propylene per molar part of sulphuric acid, mixing with the absorption product about 1.8 to 1.9 times its own weight of water, heating the mixture to hydrolyze the propyl sulphates, separating any oily matters from the hydrolysis products by decantation, distilling the residue under a pressure below 100 mm. to obtain a head product of dilute aqueous isopropyl alcohol of high purity, and continuing the distillation to obtain as base product sulphuric acid of a concentration substantially greater than 40%, the base temperature throughout the distillation being maintained below 115° C.

8. Process for the manufacture of isopropyl alcohol, which comprises absorbing in sulphuric acid of 85 to 90% concentration about 1 molar part of propylene per molar part of sulphuric acid, mixing with the absorption product about 1.8 to 1.9 times its own weight of water, heating the mixture to hydrolyze the propyl sulphates, separating any oily matters from the hydrolysis products by decantation, distilling the residue at a base temperature below about 75° C. to obtain a major portion of the recoverable alcohol as an aqueous solution of high purity, continuing the distillation with a base temperature between 75° and 115° C., and collecting separately the remaining minor portion of the recoverable alcohol as a more dilute aqueous solution, the entire distillation being conducted under a pressure below 100 mm. and being continued to obtain as base product sulphuric acid of at least 70% concentration.

WILLIAM HUNTER.

REFERENCES CITED

The following references are of record in the file of this patent:

UNITED STATES PATENTS

| Number | Name | Date |
|---|---|---|
| 1,486,646 | Ellis et al. | Mar. 11, 1924 |
| 1,912,695 | Engs et al. | June 6, 1933 |
| 1,915,820 | Engs et al. | June 27, 1933 |
| 1,954,506 | van Peski et al. | Apr. 30, 1934 |
| 2,045,616 | Sargent | June 30, 1936 |
| 2,076,213 | van de Griendt | Apr. 6, 1937 |
| 2,106,877 | Shiffler et al. | Feb. 1, 1938 |
| 2,114,463 | Brooks | Apr. 19, 1938 |